United States Patent [19]
Dippel et al.

[11] Patent Number: 6,104,772
[45] Date of Patent: *Aug. 15, 2000

[54] METHOD AND APPARATUS FOR INTRODUCING A SELF-PROPELLED IN-PIPE MANIPULATOR INTO A PIPELINE

[75] Inventors: Bruno Dippel, Poxdorf; Reinhardt Strobel, Nürnberg, both of Germany

[73] Assignee: Siemens Aktiengesellschaft, Munich, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 09/061,375

[22] Filed: Apr. 16, 1998

Related U.S. Application Data

[63] Continuation of application No. PCT/DE96/01902, Oct. 2, 1996.

[30] Foreign Application Priority Data

Oct. 16, 1995 [DE] Germany ............................ 195 38 442

[51] Int. Cl.[7] ........................ G21C 17/01; G21C 17/013; G21C 17/017
[52] U.S. Cl. .......................... 376/249; 376/245; 376/248; 376/260; 104/138.2
[58] Field of Search ..................... 376/245, 248, 376/260, 249; 104/138.2

[56] References Cited

U.S. PATENT DOCUMENTS

| | | | |
|---|---|---|---|
| 2,975,637 | 3/1961 | Burdick | 73/304 |
| 3,606,862 | 9/1971 | Huff et al. | 118/306 |
| 3,979,941 | 9/1976 | Auxer | 72/466 |
| 4,034,679 | 7/1977 | Gaither et al. | 104/138 R |
| 4,244,296 | 1/1981 | Vertut | 104/138 G |
| 4,919,194 | 4/1990 | Gery et al. | 165/1 |
| 4,954,312 | 9/1990 | McDonald et al. | 376/260 |
| 5,025,670 | 6/1991 | McNulty et al. | 73/865.8 |
| 5,117,897 | 6/1992 | Robert | 165/11.2 |
| 5,285,689 | 2/1994 | Hapstack et al. | 73/623 |
| 5,504,788 | 4/1996 | Brooks et al. | 376/248 |
| 5,515,589 | 5/1996 | Kazirskis et al. | 29/402.18 |
| 5,565,633 | 10/1996 | Wernicke | 73/865.8 |
| 5,611,283 | 3/1997 | Cotton et al. | 104/138.2 |
| 5,660,202 | 8/1997 | Rush, Jr. et al. | 137/318 |

FOREIGN PATENT DOCUMENTS

| | | |
|---|---|---|
| 0204694B1 | 12/1986 | European Pat. Off. . |
| 0656449A2 | 6/1995 | European Pat. Off. . |
| 2211622 | 7/1974 | France . |
| 2381657 | 9/1978 | France . |
| 3244384 | 6/1984 | Germany ............ 376/249 |
| 3412519C2 | 8/1993 | Germany . |
| 6-123402 | 5/1994 | Japan ............. F22B 37/02 |
| 2247505A | 3/1992 | United Kingdom . |

Primary Examiner—Charles T. Jordon
Assistant Examiner—Jack Keith
Attorney, Agent, or Firm—Herbert L. Lerner; Laurence A. Greenberg; Werner H. Stemer

[57] ABSTRACT

A method and an apparatus introduce a self-propelled in-pipe manipulator into the interior of a pipeline. A hollow body receives the in-pipe manipulator, is open at least at one end surface and is positioned at an opening of the pipeline, from where the in-pipe manipulator can drive on its own into the pipeline.

6 Claims, 1 Drawing Sheet

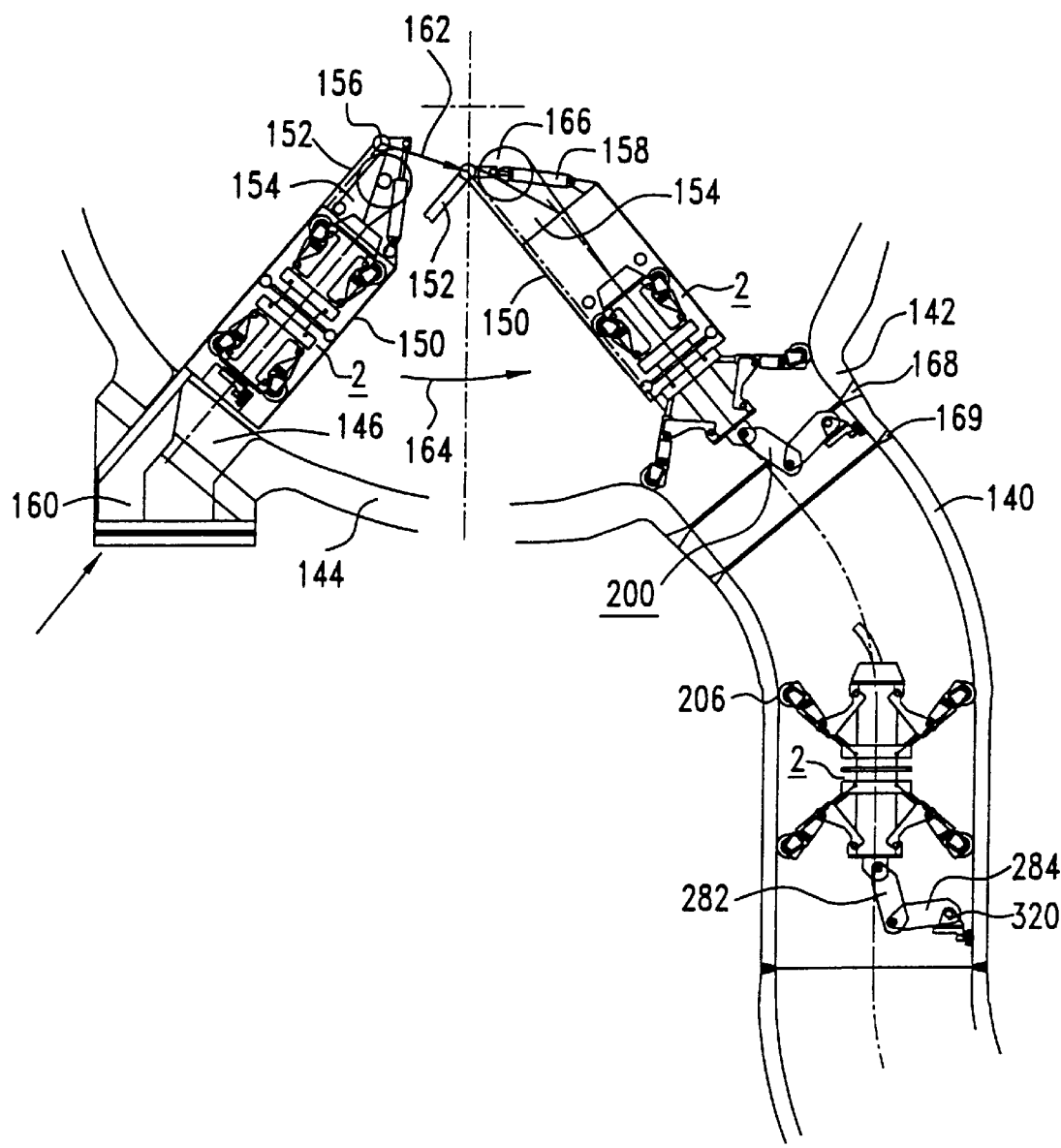

METHOD AND APPARATUS FOR INTRODUCING A SELF-PROPELLED IN-PIPE MANIPULATOR INTO A PIPELINE

CROSS-REFERENCE TO RELATED APPLICATION

This application is a continuation of International Application Ser. No. PCT/DE96/01902, filed Oct. 2, 1996, which designated the United States.

BACKGROUND OF THE INVENTION

Field of the Invention

The invention relates to a method and an apparatus for introducing a self-propelled in-pipe manipulator into a pipeline.

Pipelines in system parts relevant to safety, such as the primary loop of a nuclear power plant, must be inspected and maintained at regular intervals. In particular, regulation inspection of weld seams on the insides of such pipelines is necessary. The equipment used for the inspection or the work is put into an inspection or machining position by self-propelled vehicles, as a rule.

Such self-propelled in-pipe manipulators are known, for instance, from German Patent DE 34 12 519 C2. That patent discloses an in-pipe manipulator in which a radially adjustable inspection system carrier is disposed between two support surfaces. It can be rotated about the longitudinal axis of the in-pipe manipulator and in that way enables inspection of the inner surface of the pipe over its entire circumference.

European Patent 0 204 694 B1 discloses an in-pipe manipulator in which a machining device on a chassis that can be driven on wheels is supported in a revolving shackle that is disposed on an L-shaped bearing rotatably supported on an end surface of the vehicle.

When pipelines are inspected or machined, a problem which arises among others is that the weld seams to be inspected or machined may be located immediately behind an opening through which the in-pipe manipulator has to be introduced into the pipe. In principle, such weld seams located directly at the pipe opening cannot be detected by the in-pipe manipulator that is known, for instance, from German Patent DE 34 12 519 C2, because that in-pipe manipulator is not ready for use until both of its two support flanges have been positioned all the way into the pipe. In the device known from European Patent 0 204 694 B1, it is indeed possible to inspect or machine in the peripheral region of a pipe, but under some circumstances that requires turning the in-pipe manipulator around and introducing it into the pipe facing in the opposite direction, if inspection or work positions at the beginning and ending regions of a pipe are to be detected.

SUMMARY OF THE INVENTION

It is accordingly an object of the invention to provide a method and an apparatus for introducing a self-propelled in-pipe manipulator into a pipeline, which overcome the hereinafore-mentioned disadvantages of the heretofore-known apparatuses and methods of this general type and which also make it possible to inspect or machine at positions located directly in an opening, mouth or inlet region of the pipe.

With the foregoing and other objects in view there is provided, in accordance with the invention, in a method for introducing a self-propelled in-pipe manipulator into a pipeline having an opening and branching off from a nuclear steam generator, the improvement which comprises positioning a hollow body receiving the in-pipe manipulator and having at least one open end surface in the steam generator at the opening of the pipeline; and driving the in-pipe manipulator on its own from the hollow body into the pipeline.

In this way, the inspection manipulator can drive to inspection or work positions directly at the opening of the pipe, since the hollow body acts as a kind of extension of the tube and permits fixation of the in-pipe manipulator even when it has not yet been driven into the pipeline or has driven only partway into the pipeline. In this way, the in-pipe manipulator can also detect inspection and work positions located at the beginning or ending region of a pipe. The function of the hollow body which is used thus goes beyond the function of an aid in introducing non-self-propelled in-pipe manipulators that are advanced from the outside, of the kind that are known, for instance, from UK Patent Application GB 2 247 505 A. That patent discloses merely a chute, with the aid of which a camera that can be advanced through a flexible plastic rod can be threaded into a pipeline extending crosswise to a connection stub.

In accordance with another mode of the invention, the hollow body is a hollow cylinder, which in particular is positioned centrally relative to the opening of the pipeline.

In accordance with a further mode of the invention, which is suitable, in particular, for introducing a self-propelled in-pipe manipulator into a pipeline branching off from a nuclear steam generator, the hollow body is pivotably fixed on a boom or crosspiece. With the aid of this boom, the hollow body is introduced into the steam generator through a manhole in the steam generator and there is positioned, by displacement of the boom and by swiveling, above an opening of the pipeline in such a way the center axis of the hollow body and the center axis of the pipeline are virtually aligned with one another in the region of this opening.

With the objects of the invention in view, there is also provided, in an apparatus for introducing a self-propelled in-pipe manipulator into an interior of a pipeline having an opening and branching off from a steam generator, the improvement comprising a hollow body for receiving the in-pipe manipulator and for entering into the steam generator, the hollow body having at least one open end surface; and a positioning device to be introduced at least partway into the steam generator, the hollow body disposed on the positioning device for positioning the hollow body at the opening of the pipeline and permitting the in-pipe manipulator to drive on its own into the pipeline.

In accordance with another feature of the invention, the hollow body is a hollow cylinder.

In accordance with a concomitant feature of the invention, the positioning device includes a displaceable boom, on which the hollow body is pivotably disposed.

Other features which are considered as characteristic for the invention are set forth in the appended claims.

Although the invention is illustrated and described herein as embodied in a method and an apparatus for introducing a self-propelled in-pipe manipulator into a pipeline, it is nevertheless not intended to be limited to the details shown since various modifications and structural changes may be made without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTIONS OF THE DRAWINGS

The FIGURE of the drawing is a fragmentary, diagrammatic, sectional view of an exemplary embodiment of an apparatus for introducing an in-pipe manipulator into a pipeline of a primary loop of a nuclear power plant.

DESCRIPTION OF THE PREFERRED EMBODIMENTS

Referring now in detail to the single FIGURE of the drawing, there is seen a pipeline 140 in a primary loop of a nuclear power plant with a pressurized water reactor, which leads from a stub 142 in a dome of a steam generator 144 to a non-illustrated pump. The stub 142 forms an opening which can be reached only through a relatively narrow manhole 146 of the steam generator 144. A self-propelled in-pipe manipulator 2 must be driven in through this opening. To that end, the in-pipe manipulator 2 is introduced into a tubular hollow-cylindrical hollow body 150 that is open on both ends. The in-pipe manipulator 2 is positioned together with the hollow body 150 above the stub 142 with the aid of a boom or crosspiece 152 which is part of a positioning device and protrudes through the manhole 146 into the steam generator 144. To that end, the hollow body 150 is provided with a shell-like support frame 154, which is pivotably supported about a pivot axis extending perpendicular to the boom 152, in a pivot bearing 156 on the boom 152. This pivoting motion is executed with a hydraulic cylinder 158, which is supported between the hollow body 150 and the boom 152.

The boom 152 is mounted on a support stand 160, which is positionable outside the steam generator 144, and the boom is oriented in such a way that a pivot axis of its pivot bearing 156 is oriented perpendicular to a plane defined by center axes of the stub 142 and the manhole 146. Through the use of a linear displacement of the boom 152, as represented by an arrow 162 in the drawing, the pivot bearing 156 is positioned virtually at an angle bisector between these center axes, so that a simple pivoting motion, indicated by an arrow 164, enables an adequately exact positioning of the hollow body 150 oriented coaxially to the center axis of the stub 142.

A deflection roller 166 which is also disposed on the support frame 154 is provided both for a cable required for supplying the in-pipe manipulator 2 and for a recovery rope, with which the in-pipe manipulator 2 can be retrieved from the pipeline 140 if it fails.

The in-pipe manipulator 2 which is shown as an example in the drawing includes a pivot arm 200 disposed on its end surface, with two pivotable intermediate members 282 and 284 and a pivotable terminal member 320 that can be retracted nearly all the way into the interior of the chassis. The in-pipe manipulator 2 is also provided with a plurality, for example six or eight, rollers 206 which are supported extensibly on the base body of the in-pipe manipulator 2. With such an in-pipe manipulator 2, poorly accessible pipelines 140 can be reached even under spatially tight conditions, since the in-pipe manipulator has relatively small dimensions in an initial state. Moreover, since the rollers 206 can be extended relatively far, the demands for precision in positioning the hollow body 150 above the opening are less stringent, because the in-pipe manipulator can be driven into the pipeline 140 even if its center axis and the center axis of the opening are not exactly aligned with one another.

In the drawing, the in-pipe manipulator 2 is shown in various working positions. It can be seen that the hollow body 150 performs not only the function of positioning the in-pipe manipulator 2 at a location suitable for introduction into the pipeline 140, but moreover also makes it possible to inspect weld seams positioned directly at the beginning of the pipeline, in this example weld seams 168, 169 on the stub 142 of the steam generator 144, with the aid of the in-pipe manipulator 2, without requiring that the in-pipe manipulator 2 be driven back into the pipeline 140 again in reverse orientation, after inspecting the weld seams located farther into the pipeline 140. Once the pivot arm 200 has been extended, the in-pipe manipulator 2 can already begin its inspection when the chassis is still completely inside the hollow body 150 or is still partly inside the hollow body 150, as explicitly shown in the drawing. This enables inspection of all of the weld seams of the pipeline 140 without requiring the in-pipe manipulator 2 to be turned around.

In principle, however, other in-pipe manipulators, for instance of the kind known from the references cited at the outset, may also be introduced into a pipe with the aid of the apparatus of the invention. Depending on the structural layout of the in-pipe manipulator, it may be necessary in an individual case to use a hollow body which is adapted in its dimensions to the dimensions of the opening of the pipeline and which must be positioned at the opening in relatively exact alignment with the pipeline.

We claim:

1. In a method for introducing a self-propelled in-pipe manipulator into a pipeline having an opening and branching off from a nuclear steam generator, the improvement which comprises:

providing a hollow body having at least one open end;

positioning the in-pipe manipulator in the hollow body;

positioning the hollow body in the steam generator such that the hollow body is entirely disposed within the steam generator at a location remote from the opening of the pipeline; and subsequently;

positioning the hollow body in the steam generator at the opening of the pipeline; and driving the in-pipe manipulator on its own from the hollow body into the pipeline.

2. The method according to claim 1, which comprises selecting a hollow cylinder as the hollow body.

3. The method according to claim 1, which comprises positioning the hollow body centrally relative to the opening of the pipeline.

4. In a method for introducing a self-propelled in-pipe manipulator into a pipeline having an opening and branching off from a nuclear steam generator, the improvement which comprises:

providing a hollow body having at least one open end;

pivotally fixing the hollow body on a boom;

introducing the hollow body into the steam generator through a manhole in the steam generator with the boom;

positioning the in-pipe manipulator in the hollow body;

positioning the hollow body in the steam generator by displacement of the boom and by swiveling above the opening of the pipeline for substantially aligning a center axis of the hollow body and a center axis of the pipeline with one another in the vicinity of the opening; and driving the in-pipe manipulator on its own from the hollow body into the pipeline.

5. In an apparatus for introducing a self-propelled in-pipe manipulator into an interior of a pipeline having an opening and branching off from a steam generator, the improvement comprising:

- a hollow body for receiving the in-pipe manipulator and for entering into the steam generator, said hollow body having at least one open end; and
- a positioning device to be introduced at least partway into the steam generator, said positioning device associated with said hollow body for positioning said hollow body at the opening of the pipeline and permitting the in-pipe manipulator to drive on its own into the pipeline, said positioning device including a displaceable boom pivotally mounted to said at least one open end of said hollow body.

6. The apparatus according to claim 5, wherein said hollow body is a hollow cylinder.

* * * * *